(12) United States Patent
Longo et al.

(10) Patent No.: US 11,514,181 B2
(45) Date of Patent: Nov. 29, 2022

(54) BIN SYNCING TECHNIQUE FOR MULTIPLE DATA PROTECTION SCHEMES

(71) Applicant: NetApp, Inc., Sunnyvale, CA (US)

(72) Inventors: Austino Longo, Boulder, CO (US); Daniel David McCarthy, Erie, CO (US); Christopher Clark Corey, Boulder, CO (US); Sneheet Kumar Mishra, Lafayette, CO (US)

(73) Assignee: NetApp, Inc., San Jose, CA (US)

( * ) Notice: Subject to any disclaimer, the term of this patent is extended or adjusted under 35 U.S.C. 154(b) by 352 days.

(21) Appl. No.: 16/788,979

(22) Filed: Feb. 12, 2020

(65) Prior Publication Data

US 2021/0248254 A1 Aug. 12, 2021

(51) Int. Cl.
| | |
|---|---|
| *G06F 21/00* | (2013.01) |
| *H04L 9/00* | (2022.01) |
| *G06F 16/27* | (2019.01) |
| *G06F 21/62* | (2013.01) |
| *H04L 9/32* | (2006.01) |

(52) U.S. Cl.
CPC .......... *G06F 21/6218* (2013.01); *G06F 16/27* (2019.01); *H04L 9/3236* (2013.01)

(58) Field of Classification Search
CPC .... G06F 21/6218; G06F 16/27; G06F 16/182; H04L 9/3236; H04L 9/12; H04L 9/3239
See application file for complete search history.

(56) References Cited

U.S. PATENT DOCUMENTS

| | | | | |
|---|---|---|---|---|
| 10,169,169 | B1* | 1/2019 | Shaikh | G06F 11/2094 |
| 10,698,767 | B1* | 6/2020 | De Kadt | G06F 16/2315 |
| 2015/0019937 | A1* | 1/2015 | Baker | G06F 3/0605 |
| | | | | 714/769 |
| 2015/0278324 | A1* | 10/2015 | Wong | G06F 11/08 |
| | | | | 707/634 |
| 2017/0220295 | A1* | 8/2017 | Khan | G06F 3/0608 |
| 2019/0354450 | A1* | 11/2019 | Grunwald | G06F 16/1824 |
| 2021/0019067 | A1* | 1/2021 | Miller | G06F 3/0641 |

* cited by examiner

*Primary Examiner* — Haresh N Patel
*Assistant Examiner* — Kevin Ayala
(74) *Attorney, Agent, or Firm* — Jaffery Watson Mendonsa & Hamilton LLP

(57) ABSTRACT

A bin syncing technique ensures continuous data protection, such as replication and erasure coding, for content driven distribution of data served by storage nodes of a cluster in the event of failure to one or more block services configured to process the data. The cluster maintains information about the block services assigned to host a bin with a copy of the data in a bin assignment table associated with a state. The copies of the data are named, e.g., replica 0 (R0), replica 1 (R1) or replica 2 (R2). In response to failure of one or more block services assigned to host a bin with a replica of the data, an alternate or replacement block service may access the assignments maintained in the bin assignment table, which specify names of the replicas associated with the state.

20 Claims, 11 Drawing Sheets

BIN SYNCING TECHNIQUE FOR MULTIPLE DATA PROTECTION SCHEMES

BACKGROUND

Technical Field

The present disclosure relates to protection of data served by storage nodes of a cluster and, more specifically, to ensuring continuous data protection of content driven distributed data blocks served by the storage nodes of the cluster.

Background Information

A plurality of storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as volumes accessible as logical units (LUNs). Each volume may be implemented as a set of data structures, such as data blocks that store data for the volume and metadata blocks that describe the data of the volume. For example, the metadata may describe, e.g., identify, storage locations on the devices for the data. The data of each volume may be divided into data blocks. The data blocks may be distributed in a content driven manner throughout the nodes of the cluster so as to even out storage utilization and input/output (I/O) load across the cluster. To support increased durability of data, the data blocks may be replicated among the storage nodes.

To further improve storage capacity, data redundancy methods may be used wherein there are typically multiple copies, e.g., two or more copies, or encoded redundant information of data. However, when such a multiple replica storage system includes widely distributed data, rebuilding that data may suffer from deadlock and/or be time consuming. This is unacceptable for recovery and does not allow for sufficient availability guarantees.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
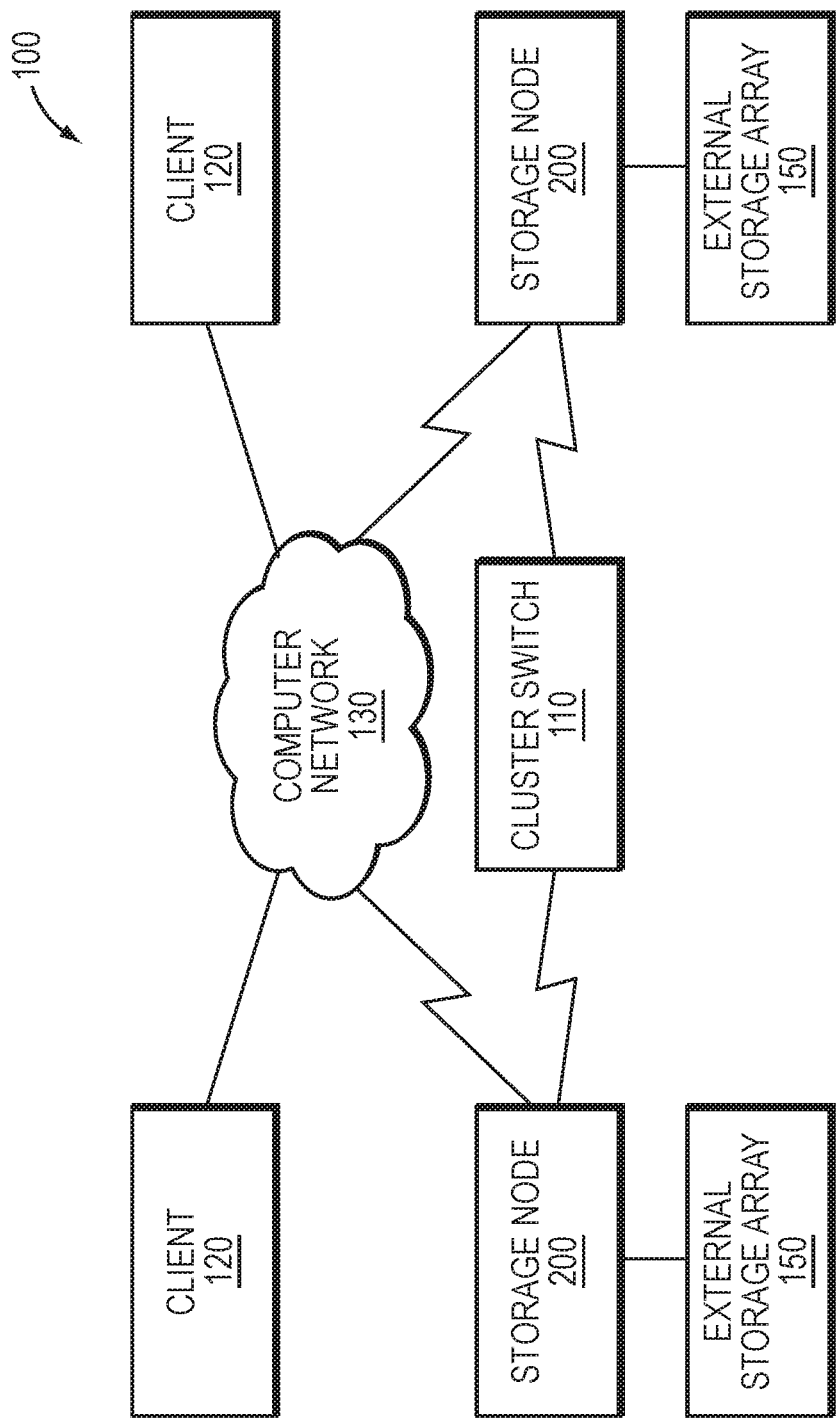
FIG. 1 is a block diagram of a plurality of storage nodes interconnected as a storage cluster.

The embodiments described herein are directed to a bin syncing technique configured to ensure continuous data protection, such as replication and erasure coding, for content driven distribution of data of logical volumes ("volumes") served by storage nodes of a cluster in the event of failure to one or more block services configured to process the data. Illustratively, data blocks are distributed in the cluster using a cryptographic hash function of the data blocks associated with bins allotted (i.e., assigned) to storage services of the nodes. The cryptographic hash function illustratively provides a satisfactory random distribution of bits such that the data blocks may be distributed approximately evenly within the nodes of the cluster. Each volume may be implemented as a set of data structures, such as data blocks that store data for the volume and metadata blocks that describe the data of the volume. The storage service implemented in each node includes a metadata layer having one or more metadata (slice) services configured to process and store the metadata, and a block server layer having one or more block services configured to process and store/retrieve the data on storage devices of the node (i.e., data at rest).

According to an aspect of the bin syncing technique, the cluster maintains information, such as a state, about the block services assigned to host a bin with a copy of the data. The assignments are illustratively maintained in a bin assignment table of a distributed database (e.g., zookeeper) and are denoted herein according to the expression "Block Service: State." In one or more embodiments wherein a block service (BS) hosting a bin that stores a copy of data fails, the technique initiates "healing" (i.e., functional repair) to ensure continuous data protection in the cluster by initializing an alternate BS to host the bin in the cluster, and thereafter gracefully removing and replacing the alternate BS with a replacement BS. In this manner healing provides restoration of functionality (i.e., an unavailable bin of a failed block service is restored elsewhere) using other alternate resources of the cluster to allow sufficient redundancy as defined by a data protection policy.

According to another aspect of the bin syncing technique, the copies of the data are named, e.g., replica 0 (denoted as "-0" appended to the above expression notation) or replica 1 (appending "-1" to the expression notation) for double data protection, as well as replica 2 (appending "-2" to the expression notation) for triple data protection. Note that the technique may apply to other data protection schemes, such as erasure coding, e.g., erasure encoded blocks encoding redundancy information of the data used in addition to or in lieu of redundant replicas. In response to failure of one or more block services assigned to host a bin with a replica of the data, an alternate or replacement block service may access the assignments maintained in the bin assignment table which, for this aspect of the technique, illustratively specifies names of the replicas associated with the state (denoted according to a "Block Service: State-Replica" notation). As such, the bin syncing technique is further directed to naming the replicas (R0, R1, R2) as well as to syncing among the block services hosting the replicas to enable rebuild of necessary copies to achieve the desired data redundancy protection, e.g., double, triple, etc., replication. In one or more other embodiments wherein one or more block services hosting replicas of data fail, the technique initiates healing to ensure continuous data protection in the cluster by initializing and assigning one or more alternate block services to host the replica(s), and thereafter reinstating the one or more of the failed block services for syncing data of the replicas to one or more of the alternate block services.

Illustratively, healing can be accomplished efficiently in a multiple replica storage system also having erasure coding. Note that since some data blocks may have been erasure coded, bin syncing may reconstruct data blocks to a bin. The data blocks for bin syncing may vary because a block service can be assigned bins across multiple replicas, e.g., R0, R1, R2, for a triple data protection scheme. Also, some blocks may be un-encoded replica data blocks while some blocks may be encoded parity blocks. The block service that is "spun up" (initialized) to recover from the failed block service may request replicas by accessing mapping metadata (bin assignments) to determine which active block services may have replica data in order for the new block service to recover the data that was on the drive of the failed block service. When a replica is not available, the new block service may request parity blocks and rebuild the data. Notably, a source block service may provide un-encoded data blocks when available to reduce rebuild effort. Synchronization of data occurs according to bin syncing rules based on a state of the replicas for the data that favors replication from lower numbered replicas first, among others.

DESCRIPTION

Storage Cluster

FIG. 1 is a block diagram of a plurality of storage nodes 200 interconnected as a storage cluster 100 and configured to provide storage service for information, i.e., data and metadata, organized and stored on storage devices of the cluster. The storage nodes 200 may be interconnected by a cluster switch 110 and include functional components that cooperate to provide a distributed, scale-out storage architecture of the cluster 100. The components of each storage node 200 include hardware and software functionality that enable the node to connect to and service one or more clients 120 over a computer network 130, as well as to a storage array 150 of storage devices, to thereby render the storage service in accordance with the distributed storage architecture.

Each client 120 may be embodied as a general-purpose computer configured to interact with the storage node 200 in accordance with a client/server model of information delivery. That is, the client 120 may request the services of the node 200, and the node may return the results of the services requested by the client, by exchanging packets over the network 130. The client may issue packets including file-based access protocols, such as the Network File System (NFS) and Common Internet File System (CIFS) protocols over the Transmission Control Protocol/Internet Protocol (TCP/IP), when accessing information on the storage node in the form of storage objects, such as files and directories. However, in an embodiment, the client 120 illustratively issues packets including block-based access protocols, such as the Small Computer Systems Interface (SCSI) protocol encapsulated over TCP (iSCSI) and SCSI encapsulated over FC (FCP), when accessing information in the form of storage objects such as logical units (LUNs).

Figure 2:
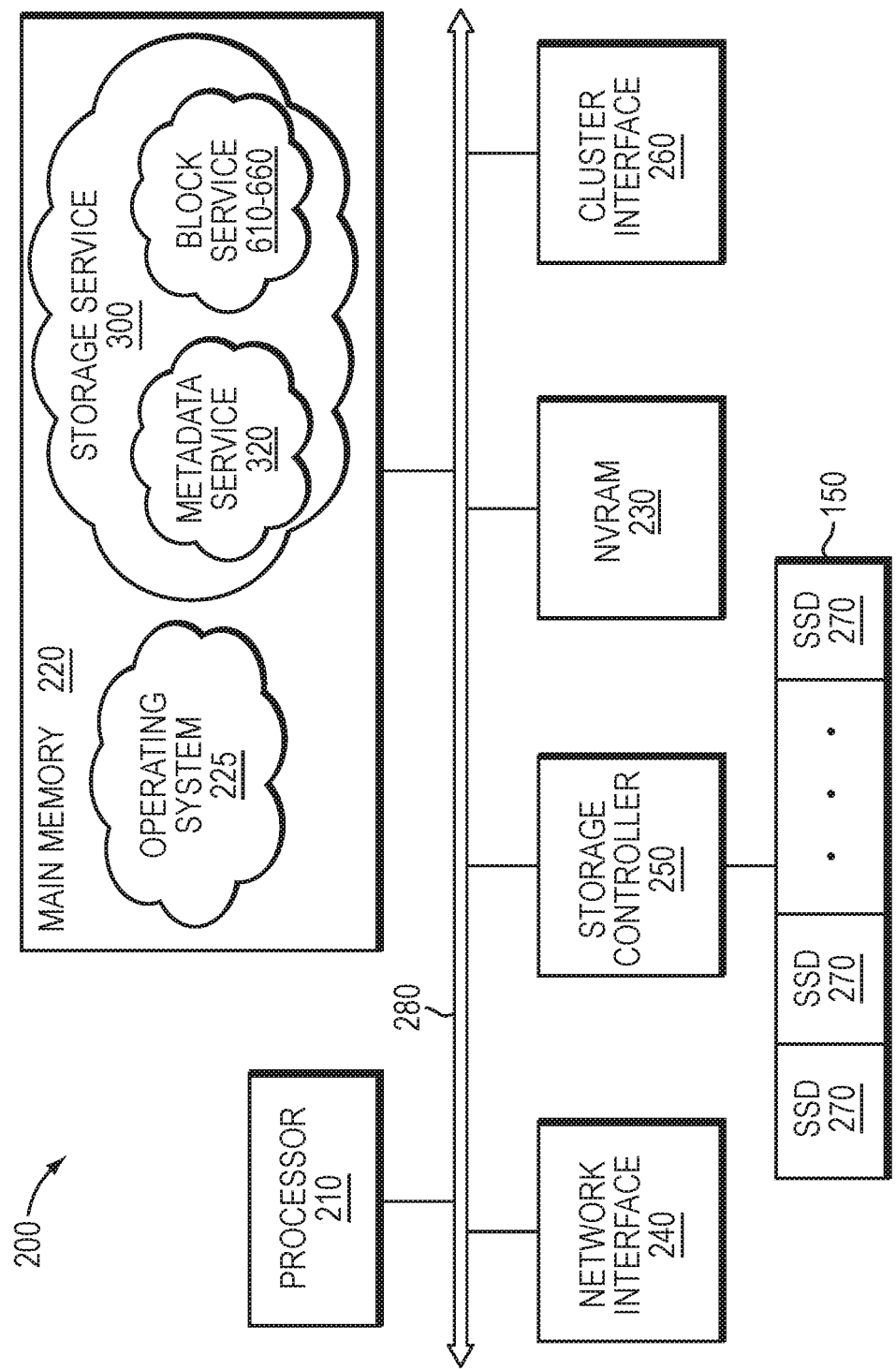
FIG. 2 is a block diagram of a storage node.

FIG. 2 is a block diagram of storage node 200 illustratively embodied as a computer system having one or more processing units (processors) 210, a main memory 220, a non-volatile random access memory (NVRAM) 230, a network interface 240, one or more storage controllers 250 and a cluster interface 260 interconnected by a system bus 280. The network interface 240 may include one or more ports adapted to couple the storage node 200 to the client(s) 120 over computer network 130, which may include point-to-point links, wide area networks, virtual private networks implemented over a public network (Internet) or a shared local area network. The network interface 240 thus includes the mechanical, electrical and signaling circuitry needed to connect the storage node to the network 130, which may embody an Ethernet or Fibre Channel (FC) network.

The main memory 220 may include memory locations that are addressable by the processor 210 for storing software programs and data structures associated with the embodiments described herein. The processor 210 may, in turn, include processing elements and/or logic circuitry configured to execute the software programs, such as one or more metadata services 320a-n and block services 610-660 of storage service 300, and manipulate the data structures. An operating system 225, portions of which are typically resident in memory 220 (in-core) and executed by the processing elements (e.g., processor 210), functionally organizes the storage node by, inter alia, invoking operations in support of the storage service 300 implemented by the node. A suitable operating system 225 may include a general-purpose operating system, such as the UNIX® series or Microsoft Windows® series of operating systems, or an operating system with configurable functionality such as microkernels and embedded kernels. However, in an embodiment described herein, the operating system is illustratively the Linux® operating system. It will be apparent to those skilled in the art that other processing and memory means, including various computer readable media, may be used to store and execute program instructions pertaining to the embodiments herein.

The storage controller 250 cooperates with the storage service 300 implemented on the storage node 200 to access information requested by the client 120. The information is preferably stored on storage devices such as internal solid-state drives (SSDs) 270, illustratively embodied as flash storage devices as well as SSDs of external storage array 150 (i.e., an additional storage array attached to the node). In an embodiment, the flash storage devices may be block-oriented devices (i.e., drives accessed as blocks) based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. The storage controller 250 may include one or more ports having I/O interface circuitry that couples to the SSDs 270 over an I/O interconnect arrangement, such as a conventional serial attached SCSI (SAS) and serial ATA (SATA) topology.

The cluster interface 260 may include one or more ports adapted to couple the storage node 200 to the other node(s) of the cluster 100. In an embodiment, dual 10 Gbps Ethernet ports may be used for internode communication, although it will be apparent to those skilled in the art that other types of protocols and interconnects may be utilized within the embodiments described herein. The NVRAM 230 may include a back-up battery or other built-in last-state retention capability (e.g., non-volatile semiconductor memory such as storage class memory) that is capable of maintaining data in light of a failure to the storage node and cluster environment.

Storage Service

Figure 3A:
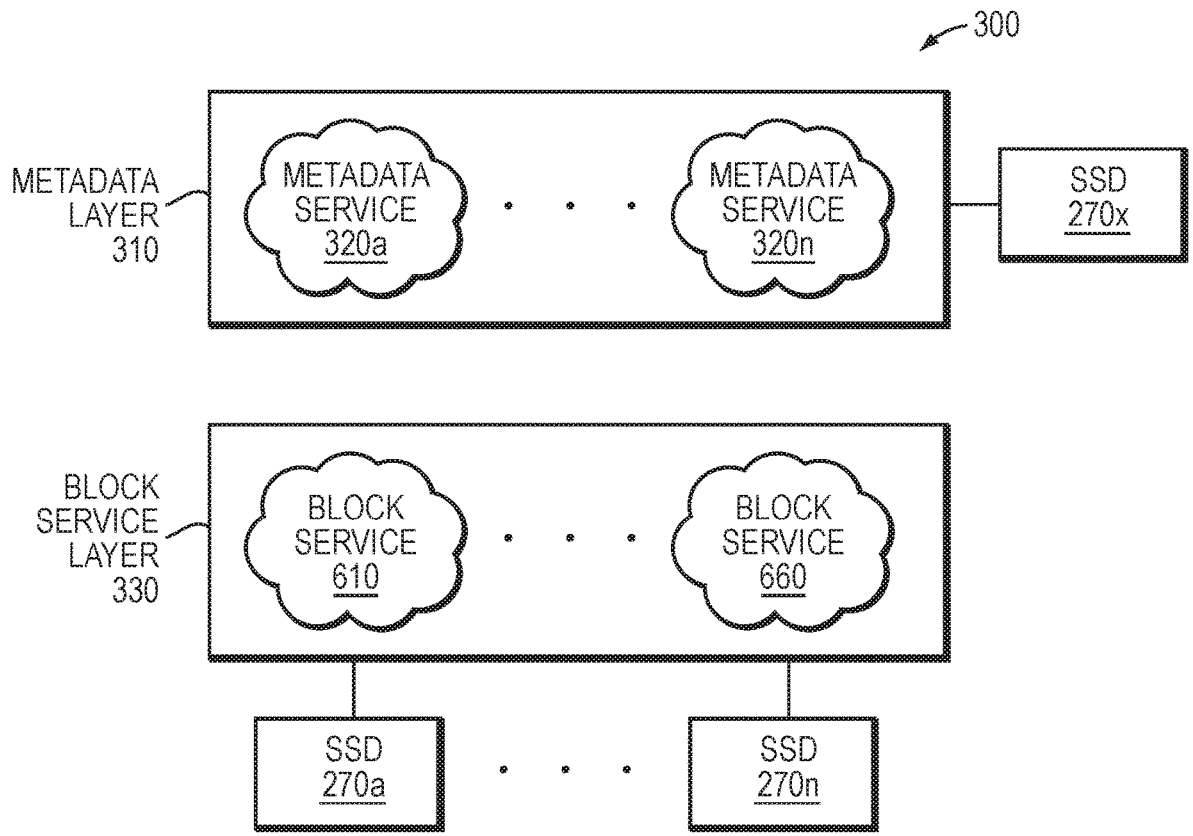
FIG. 3A is a block diagram of a storage service of the storage node.

FIG. 3A is a block diagram of the storage service 300 implemented by each storage node 200 of the storage cluster 100. The storage service 300 is illustratively organized as one or more software modules or layers that cooperate with other functional components of the nodes 200 to provide the distributed storage architecture of the cluster 100. In an embodiment, the distributed storage architecture aggregates and virtualizes the components (e.g., network, memory, and compute resources) to present an abstraction of a single storage system having a large pool of storage, i.e., all storage, including internal SSDs 270 and external storage arrays 150 of the nodes 200 for the entire cluster 100. In other words, the architecture consolidates storage throughout the cluster to enable storage of the LUNs, each of which may be apportioned into one or more logical volumes ("volumes") having a logical block size of either 4096 bytes (4 KB) or 512 bytes. Each volume may be further configured with properties such as size (storage capacity) and performance settings (quality of service), as well as access control, and may be thereafter accessible (i.e., exported) as a block storage pool to the clients, preferably via iSCSI and/or FCP. Both storage capacity and performance may then be subsequently "scaled out" by growing (adding) network, memory and compute resources of the nodes 200 to the cluster 100.

Each client 120 may issue packets as input/output (I/O) requests, i.e., storage requests, to access data of a volume served by a storage node 200, wherein a storage request may include data for storage on the volume (i.e., a write request) or data for retrieval from the volume (i.e., a read request), as well as client addressing in the form of a logical block address (LBA) or index into the volume based on the logical block size of the volume and a length. The client addressing may be embodied as metadata, which is separated from data within the distributed storage architecture, such that each node in the cluster may store the metadata and data on different storage devices (e.g., data on SSDs 270a-n and metadata on SSD 270x) of the storage array 150 coupled to the node. To that end, the storage service 300 implemented in each node 200 includes a metadata layer 310 having one or more metadata services 320a-n configured to process and store the metadata, e.g., on SSD 270x, and a block server layer 330 having one or more block services 610-660 configured to process and store the data, e.g., on the SSDs 270a-n. For example, the metadata services 320a-n map between client addressing (e.g., LBA indexes) used by the clients to access the data on a volume and block addressing (e.g., block identifiers) used by the block services 610-660 to store and/or retrieve the data on the volume, e.g., of the SSDs.

Figure 3B:
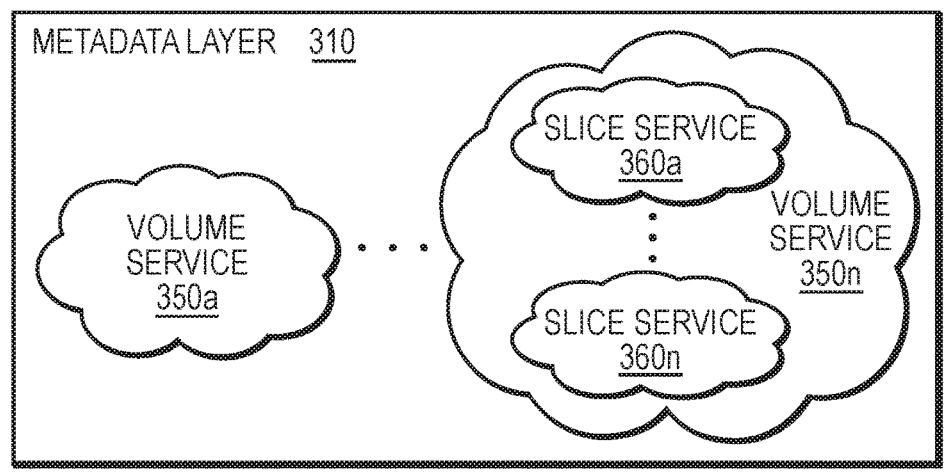
FIG. 3B is a block diagram of an exemplary embodiment of the storage service.

FIG. 3B is a block diagram of an alternative embodiment of the storage service 300. When issuing storage requests to the storage nodes, clients 120 typically connect to volumes (e.g., via indexes or LBAs) exported by the nodes. To provide an efficient implementation, the metadata layer 310 may be alternatively organized as one or more volume services 350a-n, wherein each volume service 350 may perform the functions of a metadata service 320 but at the granularity of a volume, i.e., process and store the metadata for the volume. However, the metadata for the volume may be too large for a single volume service 350 to process and store; accordingly, multiple slice services 360a-n may be associated with each volume service 350. The metadata for the volume may thus be divided into slices and a slice of metadata may be stored and processed on each slice service 360. In response to a storage request for a volume, a volume service 350 determines which slice service 360a-n contains the metadata for that volume and forwards the request the appropriate slice service 360.

Figure 4:
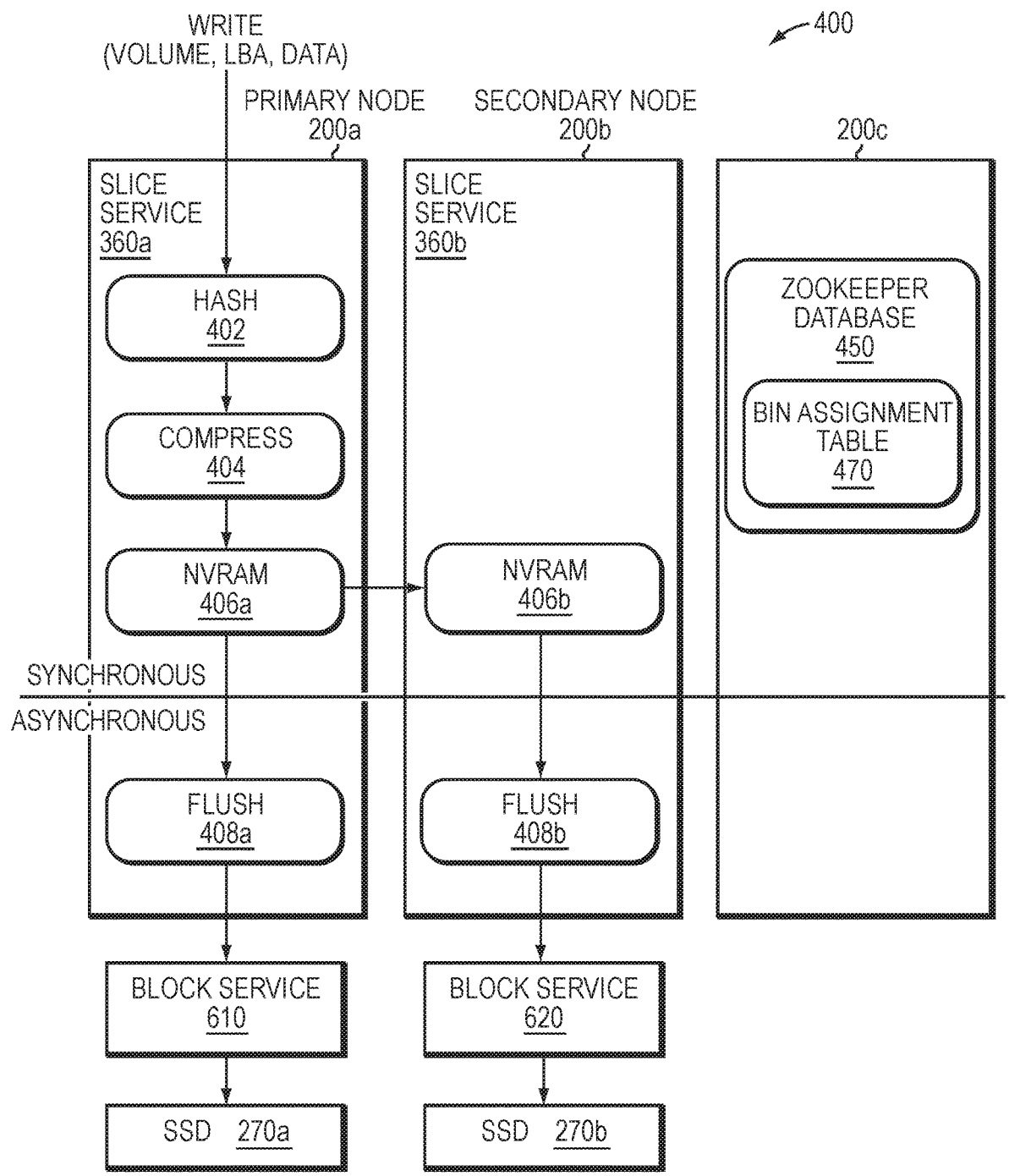
FIG. 4 illustrates a write path of the storage node.

FIG. 4 illustrates a write path 400 of a storage node 200 for storing data on a volume of a storage array 150. In an embodiment, an exemplary write request issued by a client 120 and received at a storage node 200 (e.g., primary node 200a) of the cluster 100 may have the following form:

write (volume, LBA, data)

wherein the volume specifies the logical volume to be written, the LBA is the logical block address to be written, and the data is logical block size of the data to be written. Illustratively, the data received by a slice service 360a of the storage node 200a is divided into 4 KB block sizes. At box 402, each 4 KB data block is hashed using a conventional cryptographic hash function to generate a 128-bit (16B) hash value (recorded as a block identifier (ID) of the data block); illustratively, the block ID is used to address (locate) the data on the internal SSDs 270 as well as the external storage array 150. A block ID is thus an identifier of a data block that is generated based on the content of the data block. The conventional cryptographic hash function, e.g., Skein algorithm, provides a satisfactory random distribution of bits within the 16B hash value/block ID employed by the technique. At box 404, the data block is compressed using a conventional, e.g., LZW (Lempel-Zif-Welch), compression algorithm and, at box 406a, the compressed data block is stored in NVRAM 230. Note that, in an embodiment, the NVRAM 230 is embodied as a write cache. Each compressed data block and corresponding metadata is then synchronously replicated to the NVRAM 230 of one or more additional storage nodes (e.g., secondary storage node 200b) in the cluster 100 for data protection (box 406b). An acknowledgement is returned to the client when the data block has been safely and persistently stored in the NVRAM 230a,b of the multiple storage nodes 200a,b of the cluster 100.

Figure 5:
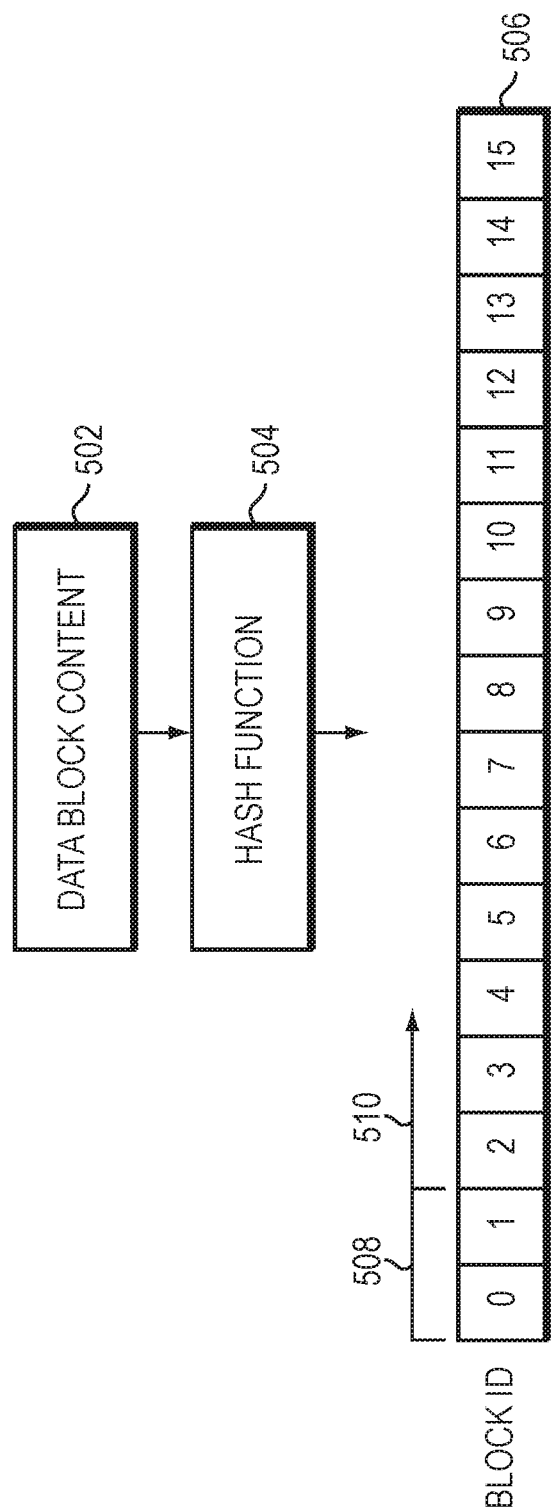
FIG. 5 is a block diagram illustrating details of a block identifier.

FIG. 5 is a block diagram illustrating details of a block identifier. In an embodiment, content 502 for a data block is received by storage service 300. As described above, the received data is divided into data blocks having content 502 that may be processed using hash function 504 to determine block identifiers (IDs) 506. That is, the data is divided into 4 KB data blocks, and each data block is hashed to generate a 16B hash value recorded as a block ID 506 of the data block; illustratively, the block ID 506 is used to locate the data on one or more storage devices 270 of the storage array 150. The data is illustratively organized within bins that are maintained by a block service 610-660 for storage on the storage devices. A bin may be derived from the block ID for storage of a corresponding data block by extracting a predefined number of bits from the block ID 506.

In an embodiment, the bin may be divided into buckets or "sublists" by extending the predefined number of bits extracted from the block ID. For example, a bin field 508 of the block ID may contain the first two (e.g., most significant) bytes (2B) of the block ID 506 used to generate a bin number (identifier) between 0 and 65,535 (depending on the number of 16 bits used) that identifies a bin. The bin identifier may also be used to identify a particular block service 610-660 and associated SSD 270. A sublist field 510 may then contain the next byte (1B) of the block ID used to generate a sublist identifier between 0 and 255 (depending on the number of 8 bits used) that identifies a sublist with the bin. Dividing the bin into sublists facilitates, inter alia, network transfer (or syncing) of data among block services in the event of a failure or crash of a storage node. The number of bits used for the sublist identifier may be set to an initial value, and then adjusted later as desired. Each block service 610-660 maintains a mapping between the block ID and a location of the data block on its associated storage device/SSD, i.e., block service drive (BSD).

Illustratively, the block ID (hash value) may be used to distribute the data blocks among bins in an evenly balanced (distributed) arrangement according to capacity of the SSDs, wherein the balanced arrangement is based on "coupling" between the SSDs, i.e., each node/SSD shares approximately the same number of bins with any other node/SSD that is not in a same failure domain, i.e., protection domain, of the cluster. As a result, the data blocks are distributed across the nodes of the cluster based on content (i.e., content driven distribution of data blocks). This is advantageous for rebuilding data in the event of a failure (i.e., rebuilds) so that all SSDs perform approximately the same amount of work (e.g., reading/writing data) to enable fast and efficient rebuild by distributing the work equally among all the SSDs of the storage nodes of the cluster. In an embodiment, each block service maintains a mapping of block ID to data block location on storage devices (e.g., internal SSDs 270 and external storage array 150) coupled to the node.

Illustratively, bin assignments may be stored in a distributed key-value store across the cluster. Referring again to FIG. 4, the distributed key-value storage may be embodied as, e.g., a "zookeeper" database 450 configured to provide a distributed, shared-nothing (i.e., no single point of contention and failure) database used to store bin assignments (e.g., a bin assignment table) and configuration information that is consistent across all nodes of the cluster. In an embodiment, one or more nodes 200c has a service/process associated with the zookeeper database 450 that is configured to maintain the bin assignments (i.e., mappings) in connection with a data structure, e.g., bin assignment table 470. Illustratively the distributed zookeeper is resident on up to, e.g., five (5) selected nodes in the cluster, wherein all other nodes connect to one of the selected nodes to obtain the bin assignment information. Thus, these selected "zookeeper" nodes have replicated zookeeper database images distributed among different failure domains of nodes in the cluster so that there is no single point of failure of the zookeeper database. In other words, other nodes issue zookeeper requests to a zookeeper database image in the cluster (zookeeper node) to obtain current bin assignments, which may then be cached at the nodes to improve access times.

For each data block received and stored in NVRAM 230a,b, the slice services 360a,b compute a corresponding bin number and consult the bin assignment table 470 to identify the SSDs 270a,b to which the data block is written. At boxes 408a,b, the slice services 360a,b of the storage nodes 200a,b then issue store requests to asynchronously flush copies of the compressed data block to the block services (illustratively labelled 610,620) associated with the identified SSDs. An exemplary store request issued by each slice service 360a,b and received at each block service 610,620 may have the following form:

store (block ID, compressed data)

The block service 610,620 for each SSD 270a,b (or storage devices of external storage array 150) determines if it has previously stored a copy of the data block. If not, the block service 610,620 stores the compressed data block associated with the block ID on the SSD 270a,b. Note that the block storage pool of aggregated SSDs is organized by content of the block ID (rather than when data was written or from where it originated) thereby providing a "content addressable" distributed storage architecture of the cluster. Such a content-addressable architecture facilitates deduplication of data "automatically" at the SSD level (i.e., for "free"), except for at least two copies of each data block stored on at least two SSDs of the cluster. In other words, the distributed storage architecture utilizes a single replication of data with inline deduplication of further copies of the data, i.e., there are at least two copies of data for redundancy purposes in the event of a hardware failure.

The embodiments described herein are directed to a bin syncing technique configured to ensure continuous data protection, such as replication and erasure coding, for content driven distribution of data served by storage nodes of a cluster in the event of failure to one or more block services configured to process the data. According to an aspect of the bin syncing technique, the cluster maintains information about the block services assigned to host a bin with a copy of the data. The assignments are illustratively maintained in the bin assignment table of the zookeeper database which may be denoted according to the expression "Block Service: State." FIGS. 6A-E illustrate example workflows of a first embodiment of the bin syncing technique wherein a block service (BS) hosting a bin that stores a copy of data fails and an alternate BS is selected and instantiated (i.e., spun-up/initialized) to host the bin. According to the technique, a BS may host a bin having (assuming) one of a plurality of states as follows:

Active (A)
Pending Removal Dead (PRD)
Updating (U)
Pending Active (PA)
Pending Removal Active (PRA)

Illustratively, the states of the block services hosting the bins are maintained in the bin assignment table as the block services transition from one state to another, as described below. Notably, bin syncing may occur among block services across the cluster concurrently and asynchronously.

Figure 6A:
FIGS. 6A-E illustrate example workflows of a first embodiment of the bin syncing technique.
Figure 6B:
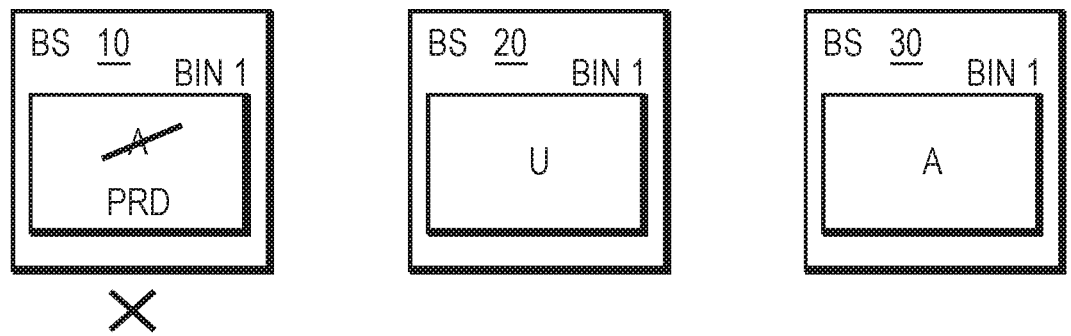

In FIG. 6A, two copies of data stored in the cluster are served by block services BS10 and BS30, each of which is assigned to host bin 1 and, thus, have an Active state (denoted as "A"). These assignments may be maintained (e.g., stored) in the bin assignment table as denoted by "BS10: A" and "BS30: A" for bin 1. Note, as is understood by persons of skill in the art, the notation used herein is a representation of underlying data structures that may embody the expression as stored in the assignment table, such as an ASCII text string. Illustratively, the Active state denotes that (i) all data is present in the bin, that (ii) the BS is healthy, i.e., the block service can service (read) the data, and that (iii) a slice service (SS) should flush (additional) data earmarked for the bin to the corresponding block service marked "A" for that bin. Subsequently, should BS10 fail (denoted by X) leaving only BS30 hosting bin 1 with a (first) copy of the data, BS10 transitions to a Pending Removal Dead (PRD) state (i.e., the bin assignment table is updated) for its hosted bin 1 (denoted as "PRD") as shown in FIG. 6B, wherein the PRD state denotes that (i) the BS is not healthy when entering the PRD state, that (ii) the data present in the bin is incomplete (may lack information before or after the failure) and, thus, is possibly deficient, and that (iii) a SS is not required to flush data for the bin to the block service marked "PRD" for that bin. That is, the slice services of the cluster suspend flushing data to the block service hosting a bin designated (e.g., marked) as having (i.e., being in) the PRD state. As such, the PRD represents a state for which a bin is incomplete (e.g., has a data deficiency) and which requires data recovery.

Illustratively, the PRD state assignment for bin 1 proceeds contemporaneously with the alternate block service (e.g., BS20) being either initialized (i.e., instantiated) and assigned bin 1 as Updating "U" (denoted U) or the running alternate block service assigned bin 1 as Updating (U) so as to host the bin of the failed BS and trigger rebuilding of the second copy of the data. Note that the rebuild may involve simple replication or erasure coding reconstruction of the data. Once initialized, BS20 accesses the Zookeeper database to determine other block service(s) from which it can obtain and synchronize (sync) the data. Illustratively, a BS or SS may determine what other services have copies (replicas) of the data for a bin by examining bin assignments (i.e., mapping metadata) published in the Zookeeper database. For example, a SS may access Zookeeper to determine to which BS it should flush data, and a BS may access Zookeeper to determine the status of a bin, as well as the BS from which it can sync the data of the bin. Because BS10 has failed, in the example, BS20 then may access the bin assignments maintained in the Zookeeper database to determine that the BS that has a copy of the data for bin 1 (and thus the only BS from which it can fetch the data) is BS30.

Figure 6C:
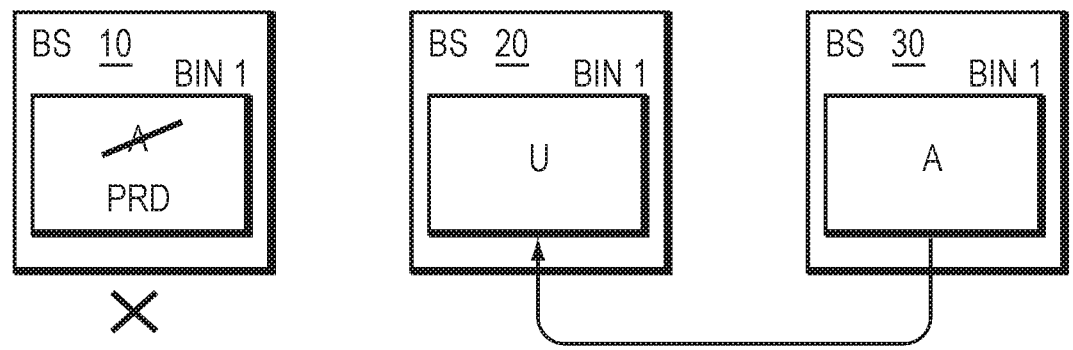
Figure 6D:
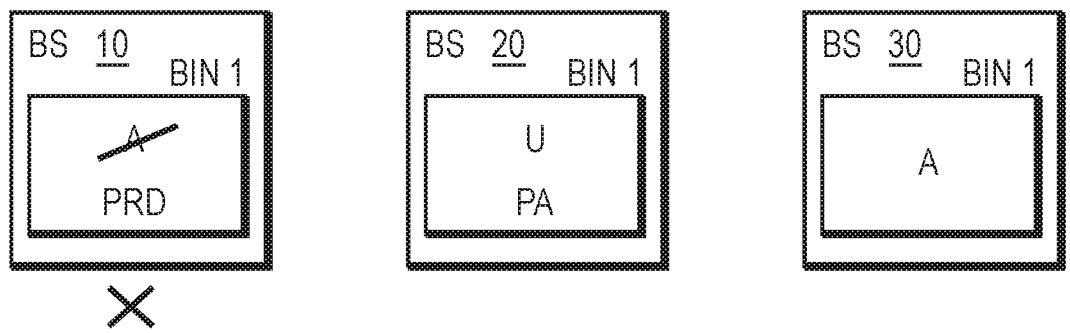
Figure 6E:
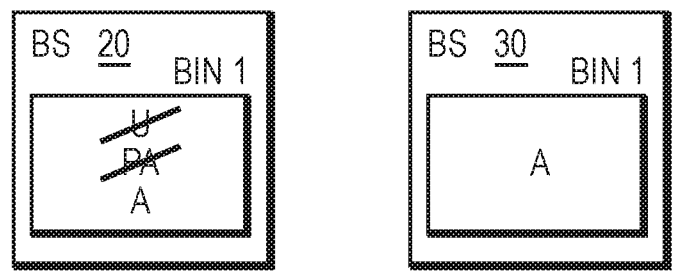

In FIG. 6C, BS20 is in the "Updating" (U) state for bin 1 and is pulling data from bin 1 in the active state ("A") hosted by BS30, wherein the U state denotes that (i) the BS is healthy, that (ii) the data received by the service is incomplete (data may be received before the failure via syncing and after the failure by flushed writes) and that (iii) a SS should flush data for the bin to the block service marked "U" because it is available (i.e., operating nominally) to receive new data for that bin. That is, upon the failure of a block service for a given bin (e.g., BS10), a complete copy of the data exists as a union of the data on the failed block service (BS10) for that bin and the alternate block service (BS20) for that bin. As such, Update represents a state for which a block service is rebuilding the data of the failed bin it has taken over. This assignment for BS20 is illustratively maintained in the bin assignment table denoted as "BS20: U" for bin 1. Here, BS20 may then fetch a copy of the data for bin 1 by, e.g., syncing the data from BS30. Note that the syncing of data for rebuild may occur at a lower priority than that for servicing client I/O requests. Once syncing is complete, BS20 transitions to a "Pending Active" (PA) state for bin 1 (denoted as "PA") as shown in FIG. 6D, wherein the PA state denotes that the block service is healthy, it has all the data (e.g., from BS30) and that a SS must flush the data to that bin hosted by that BS. Once the update is complete, an atomic operation is invoked (FIG. 6E) that transitions any (and all) block services hosting bins in the PA state, e.g., BS20, to "Active" ("A") as well as remove the PRD state from failed block services (e.g., BS10) so as to dissociate the failed block services from bins now assigned to alternate block services that have a complete copy of the data.

Figure 7A:
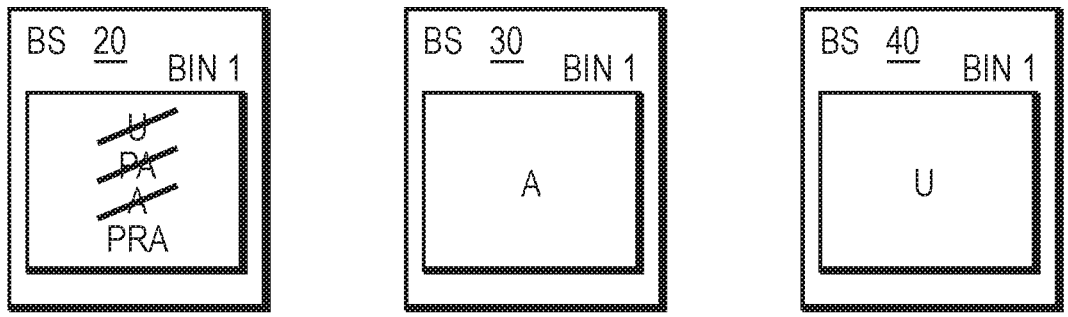
FIGS. 7A-D illustrate example workflows of a second embodiment of the bin syncing technique.

FIGS. 7A-D illustrate example workflows of a second embodiment of the bin syncing technique wherein the alternate BS hosting the bin (i.e., the BS assigned the failed bin) is gracefully removed and replaced in the cluster by a replacement BS. That is, the block service is still operating nominally (i.e., in the active state), but is replaced as servicing the bin with the replacement BS. Illustratively, this occurs when administratively removing a drive or node from the cluster. In FIG. 7A, the alternate block service (e.g., BS20) transitions to a "Pending Removal Active" (PRA) state for bin 1 (denoted as "PRA") to initiate graceful removal of the block service. The PRA state denotes a healthy block service having all of the required data such that a SS must flush to it, with the understanding that the service is in the process of being removed. Illustratively, the replacement BS (e.g., BS40) is initialized to host bin 1 (e.g., the bin assignment table is modified to indicate BS40 hosts bin 1) with the second copy of the data and, to that end, assumes an "Updating" ("U") state for bin 1.

Figure 7B:
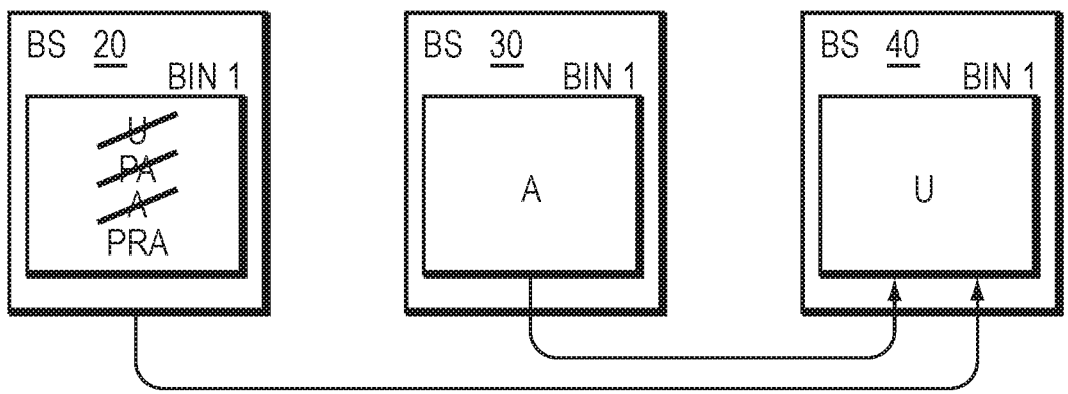
Figure 7C:
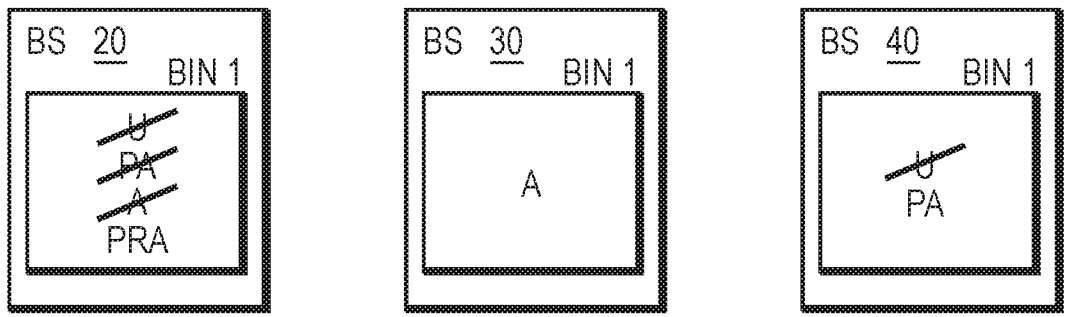
Figure 7D:
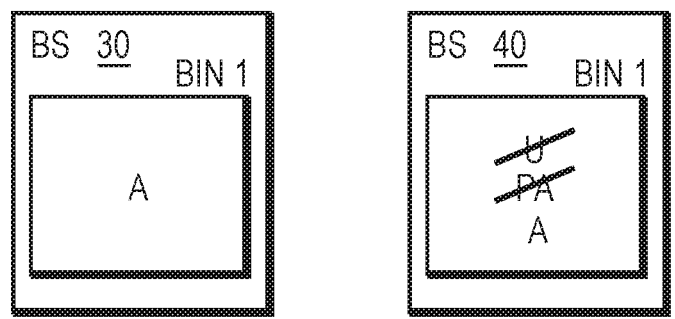

In FIG. 7B, BS40 fetches a copy of the data by syncing the data from either (or both) BS20 and BS30 since both services have the data. Once syncing is complete, BS40 transitions to a "Pending Active" (PA) state for bin 1 ("PA") as shown in FIG. 7C. Once the update is finished and BS40 has a complete copy of the data, the atomic operation is invoked (FIG. 7D) to transition all block services hosting the bins in the PA state, e.g., BS40, to the "Active" state ("A"). Since an extra (e.g., third) copy of the data is stored in the cluster, bin 1 hosted by the alternate block service (BS20) in the PRA state may be "pruned" by removing the assignment of BS20 to bin 1 from the bin assignment table 470. In this manner, the technique retains data redundancy guarantees for the storage cluster when a block service fails, e.g., failure of BS10, as illustrated in FIGS. 6A through 7D showing BS20 selected to serve as a temporary failover by hosting a copy of bin 1 (i.e., synchronizing from another copy of the bin in the cluster in the "Update" state, then subsuming the role of BS10 when completed in the "Active" state). BS20 is finally retired from that service when the replacement BS40 is determined and deployed to host the second copy of bin 1. Note that the replacement block service may be selected to host bin 1 in lieu of BS20 due to performance and/or capacity load balancing within the cluster.

According to another aspect of the bin syncing technique, the copies of the data are named, e.g., replica 0 (denoted as "-0" appended to the above expression notation) or replica 1 (denoted as "-1" appended to the expression notation) for double data protection, as well as replica 2 (denoted as "-2" appended to the expression notation) for triple data protection. The data copies may be stored in any manner or form, e.g., erasure coded, plain (i.e., un-encoded) copy, etc. At any time, the cluster may need to rebuild/construct one or more of the replicas in the event of failure of one or more block services assigned to host a bin with a plain (or parity encoded) portion of the data. In response to such failure, an alternate or replacement block service may access the assignments maintained in the bin assignment table to determine remaining block services having the data (or parity encoded portion of the data) so that data redundancy may be restored (i.e., the alternate or replacement block service duplicates or rebuilds the data). As such, the bin syncing technique is further directed to naming (tagging or associating) the replicas (R0, R1, R2) according to the notation "Block Service: State-Replica," as well as to syncing among the block services hosting the replicas to enable rebuild of necessary copies to achieve the desired data replication protection (double, triple, etc.).

Figure 8A:
FIGS. 8A-C illustrate example workflows of a third embodiment of the bin syncing technique.
Figure 8B:
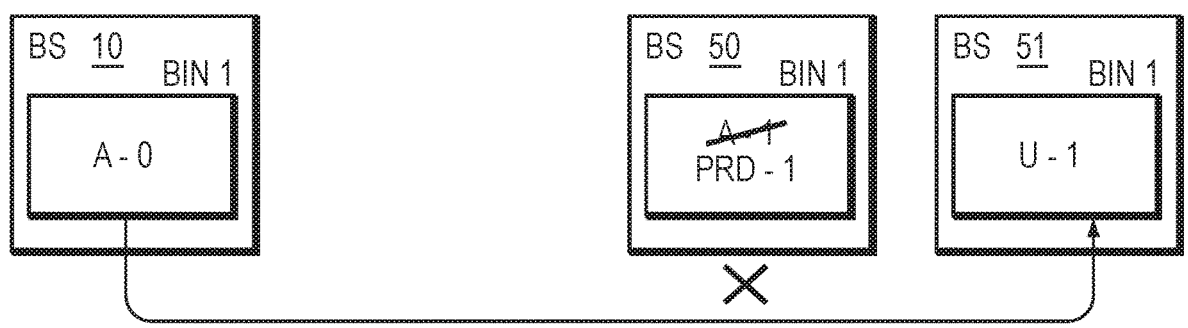
Figure 8C:
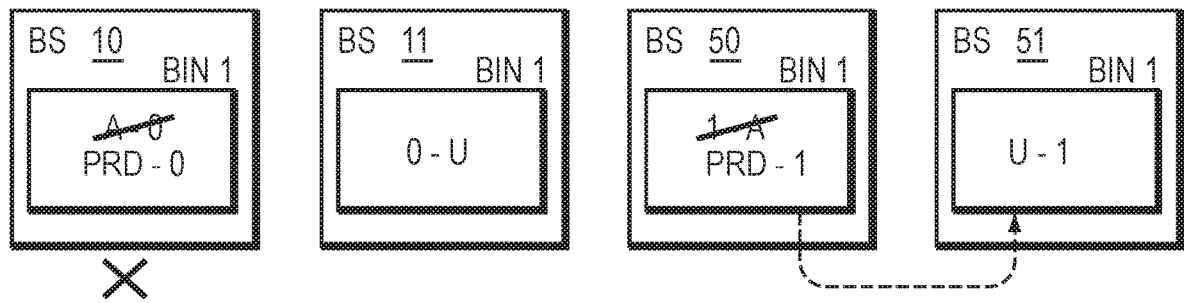

FIGS. 8A-C illustrate example workflows of a third embodiment of the bin syncing technique wherein one or more block services hosting replicas of data fail, and one or more alternate block services are initialized and assigned to host the replica(s) for a given bin. According to this aspect of the technique, the names assigned to the replicas enable the block services to locate the copies of the data in the cluster. Such naming further allows block services to fail in any order as long as the cluster can heal to a "replica count minus one", e.g., 2 replicas–1=at least one copy of data, which is all that is needed in order to synchronize automatically ("sync-out"), i.e., recover/heal by rebuilding data copies from that single copy of data to sufficient redundancy as defined by the data protection policy.

In FIG. 8A, two block services BS10 and BS50 in the cluster are assigned to host replicas of data (R0) and (R1), respectively, and thus assume an Active state (denoted as "A-0" and "A-1," respectively for a given bin, where the replica is appended to expression notation). These assignments are illustratively maintained in the bin assignment table as "BS10: A-0" and "BS50: A-1." Subsequently, BS50 fails (denoted by X) leaving only BS10 hosting R0 of the data. As a result, BS50 transitions to a PRD state for its hosted replica R1 ("PRD-1") as shown in FIG. 8B, which proceeds with a contemporaneous assignment of an Updating state ("U-1") to a selected first alternate block service (e.g., BS51) initialized and assigned to host a rebuilt replica of R1. BS51 then begins fetching a replica of the data for R1 by, e.g., syncing the data from BS10. Note that BS51 may be receiving new data from one or more slice services while syncing data from BS10 which may occur at a different priority than processing the new data according to a system policy. Note also that contemporaneous bin assignments occur as an atomic operation when bin assignments and their states are published in the zookeeper database.

Assume during syncing that BS10 fails (denoted by X) for its hosted replica 0 ("PRD-0") of bin 1, which results in triggering a rebuild of the replica 0 for the data as shown in FIG. 8C. A second alternate block service (e.g., BS11) may be selected to host replica 0 of bin 1 in lieu of BS10 and is initialized (e.g., instantiated or spun-up) and assigned to host a rebuilt replica of R0 and, therefore, assumes an "Updating" status ("U-0"). Since a double failure (BS10, BS50) has occurred and there are only two copies/replicas of the data (R0, R1) available in the cluster, one of BS50, BS10 must come back online to recover the data. If BS50 comes back (denoted by the removal of X), data may be synced to BS51 (i.e., data is pulled from BS50 to BS51, as denoted by dotted arrow) until BS51 has a full copy. Since both BS10 and BS50 are in PRD states, BS51 accesses the bin assignment table to determine that the data it needs is spread between BS10 and BS50; however, according to bin syncing rules (and, in particular, rule 1) enumerated below, BS51 may only sync from block services hosting a PRD state copy of the same replica (as denoted by the dotted arrow from BS50) to guarantee it receives all of the required data:

1) Data is considered complete when synchronized from (a) all block services hosting a PRD state copy of the same replica, or from (b) a copy of any of the replicas in the A, PA or PRA state used by the data protection scheme;
2) Synchronization is completed preferably from a lowest numbered replica first;
3) All data protection schemes in use for a bin must complete synchronization before a replica can transition into the PA state;
4) Updates/changes to bin assignments for a bin may occur when the bin completes synchronization for a replica;
5) Synchronization is tracked separately for each different data protection scheme currently in use for a bin.

Note that when BS50 failed, BS51 was brought up to host the replica of the data; however, if there are other services hosting PRD copies of that replica for that data/bin (i.e., replica 1 for bin 1), then BS51 must sync from all of those services in order to "heal" (i.e., recover data to sufficient redundancy as defined by the data protection policy). Note also that the new service can heal from an Active state, if there is a block service in that state for a data replica/bin.

Figure 9A:
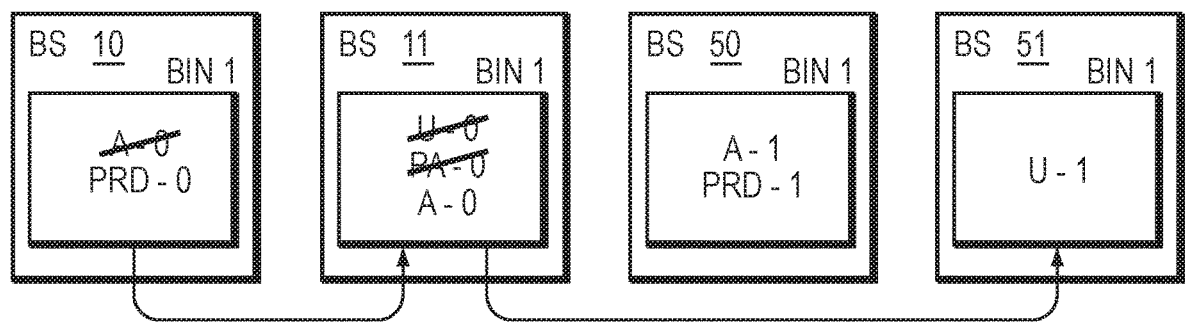
FIGS. 9A-B illustrate example workflows of a fourth embodiment of the bin syncing technique.
Figure 9B:
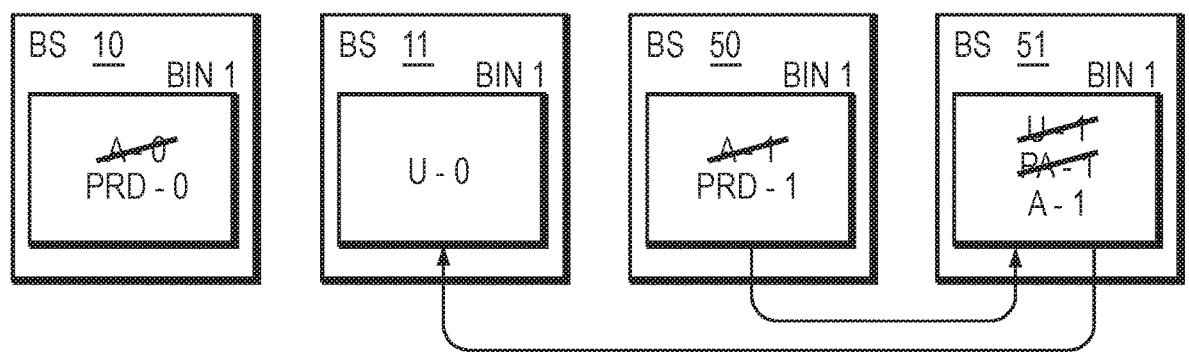

FIGS. 9A-B illustrate example workflows of a fourth embodiment of the bin syncing technique wherein one or more failed block services hosting replicas of data are reinstated and used for syncing data of the replicas to one or more alternate block services. In FIG. 9A, if BS10 is reinstated, i.e., comes back online in the PRD state ("PRD-0") before BS50 is reinstated, BS11 may sync data from BS10 (according to bin syncing rule 1(a) above) and eventually transition to an "Active" state ("A-0") for replica R0. Once BS11 is in the Active state ("A-0"), BS51 may then sync data from BS11 for replica R1 (according to bin syncing rule 1(b) above). Similarly, in FIG. 9B, if BS50 is brought back online (resumes in the PRD state, because bins hosted by BS50 may have incomplete data) before BS10 is reinstated, BS51 may sync data from BS50 and eventually transition to an "Active" state ("A-1") for replica R1. BS11 may then sync data from BS51 for replica 0. Advantageously, syncing in accordance with the technique occurs automatically (i.e., without administrative involvement) and in a distributed manner among all/any nodes of the cluster. Notably, the bin assignments operate on replicas; in the case of double data protection (double helix), there are two un-encoded replicas (R0, R1) of data, and for triple data protection (triple helix), there are three un-encoded replicas (R0, R1, R2). As long as there is no more than replica −1 (e.g., two for triple data protection) failures (i.e., at least one copy is available), the cluster can automatically synchronize to create remaining needed replicas according to the data protection policy level of redundancy.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   storing a plurality of copies of data of a bin distributed among storage nodes of a cluster, the bin being hosted on a plurality of block services of the storage nodes;
   maintaining assignments of the block services hosting the bin to the copies of the data, the assignments being maintained in a bin assignment data structure of a distributed database in the cluster;
   in response to failure of a block service storing a copy of the data, initializing an alternate block service to host the bin for storage of the copy of the data; and
   synchronizing the alternate block service with one or more remaining block services hosting remaining copies of the data to enable rebuild of the copy of data for the bin hosted by the alternate block service to ensure continuous protection of the data in the cluster, wherein maintaining the assignments of the block services comprises:
   maintaining one of a plurality of states for each bin in the bin assignment data structure with a first one of the plurality of states comprising an Active state denoting: (i) the block service is healthy to service the data, (ii) all of the data is present in the bin, and (iii) a slice service of a storage node flushes additional data earmarked for the bin to any block service marked in the Active state for that bin.

2. The method of claim 1 further comprising removing and replacing one of the block services hosting the bin from the cluster with a replacement block service to host the bin due to capacity load balancing within the cluster.

3. The method of claim 1 wherein a second state of the plurality of states comprises a Pending Removal Dead (PRD) state, wherein the PRD state denotes that (i) the block service is not healthy when entering the PRD state, (ii) the data present in the bin exists before the failure, and (iii) the slice service does not flush the additional data for the bin to the block service marked in the PRD state for that bin.

4. The method of claim 3 wherein, in response to the failure of the block service storing the copy of the data, the block service transitions from the Active state to the PRD state such that the slice service suspends flushing of the additional data to the failed block service hosting the bin marked as being in the PRD state.

5. The method of claim 3 wherein a third state of the plurality of states comprises a Pending Removal Active (PRA) state to indicate graceful removal of the alternate block service, wherein the PRA state denotes that (i) the block service is healthy, (ii) all of the data is present in the bin, and (iii) the slice service flushes the additional data earmarked for the bin to any block service marked as in the PRA state for that bin, but (iv) with the understanding that the alternate block service is in the process of being removed.

6. The method of claim 1 wherein maintaining the assignments of the block services further comprises:
    naming the copies of data as replicas of the bin hosted by the block services; and
    determining the remaining block services hosting remaining copies of the data by accessing the assignments maintained in the bin assignment data structure using the named replicas of the data.

7. The method of claim 1 wherein synchronizing the alternate block service with one or more remaining block services occurs without administrative involvement and in a distributed manner among the storage nodes of the cluster.

8. A system comprising:
    a cluster of nodes connected to a network with each node having a processor coupled to one or more storage devices, wherein the processor is configured to:
    store a plurality of copies of data of a bin distributed among the nodes, the bin being hosted on a plurality of block services of the nodes;
    maintain assignments of the block services hosting the bin to the copies of the data, the assignments being maintained in a bin assignment data structure of a distributed database in the cluster;
    in response to failure of a block service storing a copy of the data, initialize an alternate block service to host the bin for storage of the copy of the data; and
    synchronize the alternate block service with one or more remaining block services hosting remaining copies of the data to enable rebuild of the copy of data for the bin hosted by the alternate block service to ensure continuous protection of the data in the cluster, wherein the processor configured to maintain the assignments of the block services is further configured to maintain one of a plurality of states in the bin assignment data structure for each bin with a first one of the plurality of states comprising an Active state wherein the Active state denotes that (i) the block service is healthy to service the data; (ii) all of the data is present in the bin; and (iii) a slice service of a node flushes additional data earmarked for the bin to any block service marked in the Active state for that bin.

9. The system of claim 8 wherein the processor is further configured to remove and replace one of the block services hosting the bin from the cluster with a replacement block service to host the bin due to capacity load balancing within the cluster.

10. The system of claim 8 wherein a second state of the plurality of states comprises a Pending Removal Dead (PRD) state, wherein the PRD state denotes that (i) the block service is not healthy when entering the PRD state, (ii) the data present in the bin exists before the failure, and (iii) the slice service does not flush the additional data for the bin to the block service marked in the PRD state for that bin.

11. The system of claim 10 wherein, in response to the failure of the block service storing the copy of the data, the block service transitions from the Active state to the PRD state such that the slice service suspends flushing of the additional data to the failed block service hosting the bin marked as being in the PRD state.

12. The system of claim 10 wherein a third state of the plurality of states comprises a Pending Removal Active (PRA) state to initiate graceful removal of the alternate block service, wherein the PRA state denotes that (i) the block service is healthy, (ii) all of the data is present in the bin, and (iii) the slice service flushes the additional data earmarked for the bin to any block service marked in the PRA state for that bin, but (iv) with the understanding that the alternate block service is in the process of being removed.

13. The system of claim 8 wherein the processor configured to maintain the assignments of the block services is further configured to:
    name the copies of data as replicas of the bin hosted by the block services; and
    determine the remaining block services hosting remaining copies of the data by accessing the assignments maintained in the bin assignment data structure using the named replicas of the data.

14. The system of claim 8 wherein synchronizing the alternate block service with one or more remaining block services occurs without administrative involvement and in a distributed manner among the nodes of the cluster.

15. A non-transitory computer-readable medium including program instructions on one or more processors, the program instructions configured to:
    store a plurality of copies of data of a bin distributed among storage nodes of a cluster,
    the bin hosted on a plurality of block services of the storage nodes;
    maintain assignments of the block services hosting the bin to the copies of the data, the assignments maintained in a bin assignment data structure of a distributed database in the cluster;
    in response to failure of a block service storing a copy of the data, initialize an alternate block service to host the bin for storage of the copy of the data; and
    synchronize the alternate block service with one or more remaining block services hosting remaining copies of the data to enable rebuild of the copy of data for the bin hosted by the alternate block service to ensure continuous protection of the data in the cluster, wherein maintaining the assignments of the block services comprises:

maintaining one of a plurality of states for each bin in the bin assignment data structure with a first one of the plurality of states comprising an Active state denoting: (i) the block service is healthy to service the data, (ii) all of the data is present in the bin, and (iii) a slice service of a storage node flushes additional data earmarked for the bin to any block service marked in the Active state for that bin.

16. The non-transitory computer-readable medium of claim 15, wherein the program instructions are further configured to remove and replace one of the block services hosting the bin from the cluster with a replacement block service to host the bin due to capacity load balancing within the cluster.

17. The non-transitory computer-readable medium of claim 15, wherein the program instructions are further configured to, in response to the failure of the block service storing the copy of the data, transitioning the block service from the Active state to a Pending Removal Dead (PRD) state such that the slice service suspends flushing of the additional data to the failed block service hosting the bin marked as being in the PRD state.

18. The non-transitory computer-readable medium of claim 15, wherein the program instructions are further configured to, in response to the failure of the block service storing the copy of the data.

19. The non-transitory computer-readable medium of claim 15 wherein maintaining the assignments of the block services comprises: naming the copies of data as replicas of the bin hosted by the block services; and determining the remaining block services hosting remaining copies of the data by accessing the assignments maintained in the bin assignment data structure using the named replicas of the data.

20. The non-transitory computer-readable medium of claim 15 wherein synchronizing the alternate block service with one or more remaining block services occurs without administrative involvement and in a distributed manner among the storage nodes of the cluster.

\* \* \* \* \*